United States Patent
LaRiviere et al.

(10) Patent No.: US 9,071,584 B2
(45) Date of Patent: Jun. 30, 2015

(54) MULTI-TIER BANDWIDTH-CENTRIC DEDUPLICATION

(76) Inventors: Robert LaRiviere, Boulder Creek, CA (US); Timothy Stoakes, Humbug Scrub (AU)

(*) Notice: Subject to any disclaimer, the term of this patent is extended or adjusted under 35 U.S.C. 154(b) by 523 days.

(21) Appl. No.: 13/245,015

(22) Filed: Sep. 26, 2011

(65) Prior Publication Data
US 2013/0080406 A1    Mar. 28, 2013

(51) Int. Cl.
G06F 7/00 (2006.01)
H04L 29/08 (2006.01)

(52) U.S. Cl.
CPC .......... H04L 67/06 (2013.01); H04L 67/1095 (2013.01); *H04L 67/32* (2013.01); *H04L 67/2876* (2013.01)

(58) Field of Classification Search
CPC ... G06F 3/0608; G06F 3/0619; G06F 3/0641; G06F 17/30091; G06F 17/30303
See application file for complete search history.

(56) References Cited

U.S. PATENT DOCUMENTS

| | | | |
|---|---|---|---|
| 8,099,571 B1* | 1/2012 | Driscoll et al. | 711/162 |
| 8,176,277 B2* | 5/2012 | Bricker et al. | 711/162 |
| 8,463,742 B1* | 6/2013 | Floyd et al. | 707/609 |
| 2011/0225129 A1* | 9/2011 | Agrawal | 707/692 |
| 2011/0307447 A1* | 12/2011 | Sabaa et al. | 707/637 |
| 2011/0320865 A1* | 12/2011 | Jain et al. | 714/6.22 |
| 2012/0331021 A1* | 12/2012 | Lord | 707/826 |
| 2013/0046949 A1* | 2/2013 | Colgrove et al. | 711/170 |
| 2013/0110909 A1* | 5/2013 | Dean | 709/203 |

OTHER PUBLICATIONS

Stephanie N. Jones, Online De-duplicateion in a Log-Structured File System for Primary Storage, May 2011.*
Aaron Brown, Block-level Inline Data Deduplication in ext3, Dec. 23, 2010.*

* cited by examiner

*Primary Examiner* — Apu Mofiz
*Assistant Examiner* — Thu Nga Nguyen

(57) ABSTRACT

Example apparatus and methods concern multi-tier bandwidth-centric deduplication. One example apparatus supports inline bandwidth-centric deduplication with post-processing space-centric deduplication to improve inline bandwidth-centric deduplication and thereby reduce bandwidth requirements. One example method may include determining whether a bandwidth-centric deduplication device can satisfy a deduplication request associated with a data communication and then deciding whether to engage a space-centric deduplication device to co-operate in attempting to satisfy the request. More generally, the method includes controlling a first deduplication device to participate in bandwidth reduction and selectively controlling a second deduplication device to also participate in the bandwidth reduction.

10 Claims, 8 Drawing Sheets

MULTI-TIER BANDWIDTH-CENTRIC DEDUPLICATION

BACKGROUND

The amount of data being stored continues to expand. The amount of data being transmitted from place to place also continues to expand. Both storage to store data and bandwidth to transmit data are limited resources and thus can be expensive. Therefore techniques like deduplication have developed to address both space and bandwidth usage.

Space-centric deduplication addresses reducing the amount of storage required to store data by reducing the number of times duplicate data is stored. Bandwidth-centric deduplication addresses reducing the bandwidth required to transmit data by reducing the number of times duplicate data is transmitted. While there are similarities between space-centric deduplication and bandwidth-centric deduplication, there are also differences that have maintained boundaries between these two deduplication (dedupe) approaches. These boundaries lead to different apparatus being used for space-centric dedupe and bandwidth-centric dedupe, lead to different algorithms being used for space-centric dedupe and bandwidth-centric dedupe, and lead to different event horizons being present in space-centric dedupe and bandwidth-centric dedupe.

Space-centric dedupe may be performed as part of a replication process, as part of a backup process, or as part of another process that generally has an adequate time period to complete. This time period may be measured in hours or even days. Space-centric dedupe may be performed using a post-processing model where data is deduplicated after it is stored. When given adequate time and computing resources, space-centric dedupe can produce significant reductions in the amount of storage required to store data because duplicate data can be found and removed.

Bandwidth-centric dedupe may be performed as part of a data transmission process, as part of a data communication process, or as part of another process that generally has a very short time window to complete. This time window may be measured in milliseconds. Even though only milliseconds are available and even though limited computing resources may be available, bandwidth-centric dedupe can still yield reductions in bandwidth consumption. Bandwidth-centric dedupe may be performed using an inline model where data is deduplicated before it is stored.

In one example, bandwidth-centric dedupe may be performed in a wide area network (WAN) accelerator. More generally, bandwidth-centric dedupe is performed in a communication accelerating device, though few people may refer to this more general device, preferring to refer to a WAN Accelerator (WANAX). A major challenge for bandwidth-centric dedupe concerns the amount of duplicate data that can be stored in a WANAX and the amount of data that can be examined in a communication-relevant time frame by a WANAX. These limitations result in a WANAX having a limited dedupe horizon. The dedupe horizon can be limited by the amount of memory available to store data that can be compared to data transiting the WANAX, the amount of memory available to index data that can be compared to data transiting the WANAX, processing power available to compare in different ways stored data to data transiting the WANAX, and by the maximum delay acceptable for data transiting the WANAX. The horizon may therefore limit bandwidth-centric dedupe to comparing data transiting the WANAX to a small finite number of recently sent out messages, and to comparing data transiting the WANAX to a small finite amount of recently seen data. The horizon may therefore be limited to data that has been encountered in the last few minutes or seconds, to data that has been encountered in the last dozens of messages, or to the last few megabytes of data that has been encountered. Additionally, since a bandwidth-centric device may only have time to look at data from one point of view, the horizon may be limited by the perspective from which it is seen.

A post-processing dedupe device can alter the order in which it processes data while an inline device may be more limited in its ability to alter the order in which it processes data. Generally, an inline device may process data in the order in which it is received. This may limit the amount of processing that may be achieved per unit of time. Additionally, an inline device may be encountering multiple independent sets of data associated with different traffic flows. These traffic flows and sets of data may be logically distinct. Therefore, even though an individual flow or set theoretically might dedupe temporarily with respect to itself, the limited resources of the inline device may not be able to take advantage of temporal relationships that are lost due to the intermingling of the separate flows.

Space-centric dedupe may be performed, for example, in an apparatus referred to as a replication server or a dedupe device (DD). More generally, space-centric dedupe is performed in a computing device that has a processor, a memory, and an interface connecting the processor to the memory and to a set of logics. The logics may provide access to a chunking process, the chunk pool that results from the chunking process, a fingerprinting (e.g., hashing) process, an indexing process, the index that results from the indexing process, and storage for storing the chunk pool. The storage may be a single device or may take the form of a set of co-operating devices arranged in a single tier or in multiple tiers. A challenge for space-centric dedupe concerns the amount of time that it takes to examine data to root out as much duplication as possible. Another challenge for space-centric dedupe concerns the organization and placement of an index into the chunk pool which in turn creates a challenge concerning the amount of time it takes to determine whether a chunk of data is a duplicate chunk of data that already resides in the chunk pool.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
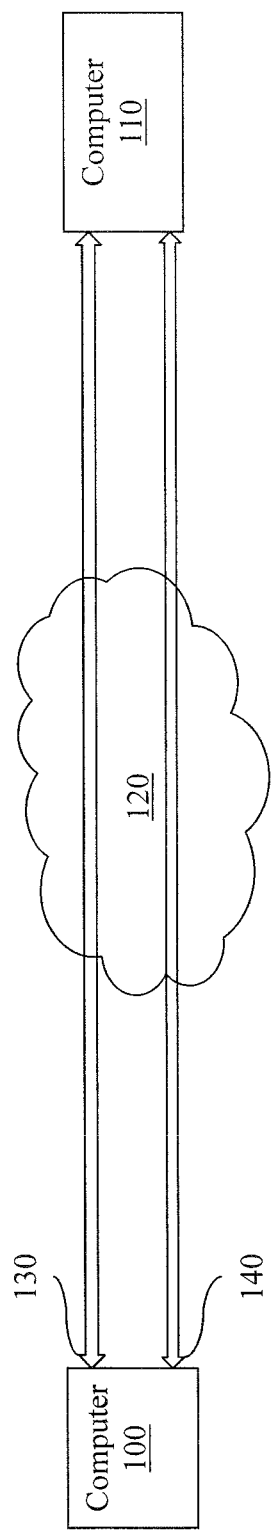
FIG. 1 illustrates a conventional network communication environment.

Example apparatus and methods combine bandwidth-centric dedupe with space-centric dedupe to improve the performance of bandwidth-centric dedupe. Space-centric dedupe may be engaged as a second dedupe tier by a first tier bandwidth centric apparatus or process. The bandwidth-centric approach or apparatus may use an inline model while the space-centric approach or apparatus may use a post-processing model. Making the relatively larger storage space and computing resources associated with space-centric dedupe available to bandwidth-centric dedupe as a second tier or second level facilitates making additional bandwidth reductions by mitigating the challenges associated with relatively small memories or caches provided by devices that typically provide inline bandwidth-centric dedupe. Example systems and methods may define a protocol between, for example, a WANAX and a dedupe device to facilitate having the dedupe device act as a second tier for the WANAX. In one example, combining WANAX based inline bandwidth-centric dedupe with dedupe device based post-processing space-centric dedupe can also improve the performance of space-centric dedupe by introducing at least some duplicate data to the dedupe device on-the-fly rather than all at once as part of a backup process. Having some portion of the data presented as encountered can reduce the amount of time required to perform a traditional replication or backup because some of the data to be replicated or backed up will have already been encountered.

A communication environment that may use the combined WANAX deduplication device (DD) approach may have a set of computing devices that are connected to a network (e.g., WAN) by respective inline bandwidth-centric WANAX. A WANAX may be connected to a post-processing space-centric dedupe device. The four apparatus may co-operate to try to deliver data from the local side of the network rather than delivering data across the network and thus reduce bandwidth usage. When a cross-network communication is required, a first attempt to deliver the data locally may be made by first sending a fingerprint or hash that can be used to potentially locate data on the local side. The combined WANAX-DD approach uses the speed of the WANAX with the additional storage of the dedupe device to extend the horizon of the WANAX bandwidth-centric dedupe.

Figure one illustrates a computer 100, a computer 110, and a network 120. At one point in time, computer 100 may be a source of data and computer 110 may be a target for data. One skilled in the art will appreciate that the computers can perform different roles at different times. Computer 100 may wish to push data to computer 110, may wish to pull data from computer 110, may request data from computer 110, or may be the target of a push from computer 110.

Regardless of which of the four communication types is to occur, to communicate across the network 120, the computers may first establish a protocol for a communication session. The protocol may be viewed as establishing the environment for a logical data transfer 130. The protocol may be, for example, an FTP (file transfer protocol), an NFS (network file system), a CIFS (common internet file system), an NDMP (network data management protocol), or some other protocol suitable for communicating across two nodes. Establishing the protocol may include exchanging protocol messages like handshaking messages, discovery messages, session messages, encryption messages, and other messages. Once the protocol is agreed upon for the session, an actual data transfer 140 may occur across the network 120. However, the amount of data to be transferred may be large and the bandwidth available to transfer that data may be small. Therefore, the transfer may be slow and the transfer may be costly. Additionally, the transfer may be wasteful when duplicative data is transmitted.

There are different types of data transfers that may occur between computer 100 and computer 110. One type of transfer concerns computer 100 pushing data to computer 110. An inefficiency can occur when computer 110 already has all or even some of the data that computer 100 pushes. In a first example, computer 100 may send a first file at time T1 and then send the exact same file at time T2. In a second example, computer 100 may send a first file at time T1 and then send a slightly modified version of the file at time T2. In both examples bandwidth is used unnecessarily to transmit duplicate data. Post-processing space-centric dedupe is concerned with this type of inefficiency during replication and backup and other times. Inline bandwidth-centric dedupe is concerned with this type of inefficiency during data transmission.

Another type of transfer concerns computer 100 pulling data from computer 110. An inefficiency can occur when computer 100 already has some or all of the data that it pulls from computer 110. In either example, bandwidth is used unnecessarily to transmit duplicate data. This unnecessary bandwidth consumption can increase costs and increase transmission delays. Once again, both bandwidth-centric and space-centric dedupe address this type of inefficiency but at different times and using different approaches.

One conventional approach to addressing the transfer time and the transfer cost associated with transmitting duplicate data involved adding an inline bandwidth-centric device like a WANAX to the communication environment. Figure two illustrates a communication environment where computers 200 and 210 communicate through network 220 using bandwidth-centric dedupe devices 202 and 212.

The computers may first establish a protocol for a communication session. The protocol (e.g., FTP, NFS, CIFS, NDMP, . . . ) may be viewed as establishing the environment for a logical data transfer 230. After the logical data transfer 230 is established, an actual data transfer 240 may occur. The data transfer 240 may take different forms since computers 200 and 210 may push data, may pull data, may have data pulled from them, or may have data pushed to them. The actual data transfer 240 may include different hops that carry different types of things.

For example, a first hop 242 may carry data to and from computer 200 to bandwidth-centric device 202. A second hop 244 may carry data and/or fingerprints (e.g., hashes) to and from the bandwidth-centric device 202 through the network 220 to the bandwidth-centric device 212. A third hop 246 may carry data to and from bandwidth-centric device 212 to computer 210. Bandwidth-centric devices 202 and 212 may be configured to perform dedupe on-the-fly for data they are encountering.

One goal of the dedupe on-the-fly for the bandwidth-centric devices 202 and 212 is to try to deliver data locally to reduce the amount of data and/or fingerprints transferred across hop 244. Bandwidth-centric devices 202 and 212 may examine data received over hops 242 and 246 to determine whether a local copy may be available and, if it is, to deliver that local copy.

A bandwidth-centric device may perform various actions on data that it encounters both from its computer facing side and from its network facing side. Received data may be chunked and fingerprinted (e.g., hashed), and then the fingerprint may be compared to a stored fingerprint to see whether the chunk has previously been encountered. If the chunk has previously been encountered, then the bandwidth-centric device may communicate the fingerprint instead of the chunk if a communication across the network 220 is required. One skilled in the art will appreciate that various chunking (e.g., fixed size, variable sized, rolling window) approaches and various fingerprinting approaches may be used.

Consider an example where computer 200 sends a first file to computer 210 and then subsequently sends a second marked up version of the first file to computer 210. While some chunks of the marked up version of the first file may be unique, some of the chunks will be duplicates. The first time the file is provided from computer 200 to computer 210, it is possible that neither bandwidth-centric device 202 nor 212 has encountered chunks from the file within their horizon. The chunks may have been encountered previously from some other file but may have been encountered outside of the event horizon, which means that in effect they may as well have never existed. Regardless of whether the chunk is truly being encountered for the first time or is only being encountered for the first time within an event horizon, it is possible that neither BCD 202 nor BCD 212 has information about the chunk. Therefore, the chunk may be transmitted across the network 220. BCD 202 and BCD 212 may store the chunk and the fingerprint for the chunk in their limited memories.

Subsequently, if the marked up version of the file is sent from computer 200 to computer 210 during the event horizon, then it is possible that information about the chunk may still reside in either BCD 202 or BCD 212. If the information still resides in BCD 202, then BCD 202 may send the related fingerprint across the network 220 to BCD 212. If BCD 212 still recognizes the fingerprint, then it may provide the related chunk to computer 210 from BCD 212 and tell BCD 202 that it already has the related chunk and that BCD 202 does not need to provide the related chunk. In one embodiment, the fingerprint may only exist on the remote node (e.g., BCD 212). In this embodiment, BCD 202 can chunk and fingerprint data without a local copy of the chunk since the data will have just arrived from computer 200. BCD 202 may be configured to store a chunk until BCD 202 gains knowledge that BCD 212 has the chunk. In another embodiment, BCD 202 may retain chunks that it has produced until space needs to be reclaimed for a new chunk. Additional bandwidth savings may be achieved if computer 210 sends another version of the file back to computer 200 within the event horizon. Ping ponging messages back and forth within an event horizon can happen during online gaming, email exchanges, thread posting, social media updating, and so on. Bandwidth-centric devices may achieve significant reductions when the same data is transmitted back and forth repetitively in a short period of time.

While this type of protocol has been demonstrated to produce bandwidth savings, this type of protocol has been limited by the size of the event horizon. Devices like BCD 202 conventionally have small memories and thus can store a small number of fingerprints and chunks. Additionally, devices like BCD 202 conventionally have limited time in which data can be examined and thus a small number of views into the data may be made. For example, the data may be partitioned using a fixed size block size (e.g., 128 bytes) and a narrow hash (e.g., 2 bytes). Even with these limitations, devices like BCD 202 have produced bandwidth savings. However, even more bandwidth savings may be achieved if the event horizon can be stretched. Configuring inline bandwidth-centric devices to work with post-processing space-centric devices provides a way to stretch the event horizon beyond the limits imposed by the small caches and resulting short lifespan of chunk information in the small caches.

Figure three illustrates an environment where bandwidth-centric devices work together with space-centric devices to stretch the event horizon for bandwidth-centric dedupe. Communicating computers will first establish a protocol (e.g., NFS, CIFS, FTP, NDMP, . . . ) for a communication session. A computer involved in the communication may act, for example, as a push source, a push target, a pull initiator, a pull provider, or in other roles.

As the communication proceeds, data may flow from a computing device to a bandwidth-centric dedupe device. If the bandwidth-centric dedupe device can accomplish a bandwidth usage reduction given its limited event horizon, then the bandwidth-centric dedupe device may do so. Additionally, the bandwidth-centric dedupe device may consult with or engage a space-centric dedupe device to determine whether the space-centric dedupe device can provide a bandwidth usage reduction. The bandwidth usage reduction may be achieved when, for example, data that might otherwise be transmitted across a network is found in a location that removes the necessity to transmit the data across the network. When the bandwidth-centric dedupe device determines that a bandwidth reduction may not be possible, the bandwidth-centric dedupe device may update its caches to prevent subsequent retransmission of data.

Additionally, the bandwidth-centric dedupe device may ask the space-centric dedupe device whether it can store information that may prevent subsequent retransmission of data. In one example, when a bandwidth-centric dedupe device needs to evict some data or fingerprint information from its cache or memory, the bandwidth-centric dedupe device may ask the space-centric dedupe device whether it can act as a secondary or extended storage for the bandwidth-centric dedupe device. These actions can extend the event horizon for a bandwidth-centric dedupe device and yield additional bandwidth savings over conventional systems, methods, and apparatus. This configuration describes the space-centric device as a second tier that is being used as a type of overflow or extended memory for a bandwidth-centric first tier. In this configuration, the second tier may have a different lifecycle for data, fingerprints, and/or chunks than the first tier which may facilitate extending the horizon of the first tier.

Figure three illustrates a computer 300, a bandwidth-centric dedupe device 302, and a space-centric dedupe device 304 located on one side of a network 320 and a computer 310, a bandwidth-centric dedupe device 312, and a space-centric dedupe device 314 located on another side of the network 320. Bandwidth-centric dedupe device 302 and space-centric dedupe device 304 can be configured to cooperate to reduce the amount of data that is transmitted over network 320.

Similarly, bandwidth-centric dedupe device 312 and space-centric dedupe device 314 can be configured to cooperate to reduce the amount of data that is transmitted over network 320. While a single space-centric dedupe device 314 and a single bandwidth-centric dedupe device 312 are illustrated co-operating, in different embodiments a single bandwidth-centric device 312 could interact with multiple space-centric devices 314 or multiple bandwidth-centric devices 312 could interact with a single space-centric device 314. Different combinations are possible.

Computer 300 and computer 310 may negotiate a protocol for a logical data transfer 330. Then, a physical data transfer 340 may occur. The physical data transfer 340 may be split into hops 342, 344, and 346. Data may flow over hops 342 and 346. Example apparatus and methods seek to reduce the amount of data that flows over hop 344.

BCD 302 may use the limited time available to BCD 302 to look for duplicate data in its limited memory and using its limited processing power. BCD 302 may also ask SCD 304 to use its larger memory and processing power to look for duplicate data. Finding duplicate data can reduce the amount of data sent through network 320 over hop 344. In one embodiment, BCD 302 may not have to ask SCD 304 to participate, the participation may be controlled by another process or entity. SCD 304 may have different types of storage available including, but not limited to, disk 305, solid state device 306, and tape 307. Similarly, SCD 314 may have different types of storage available including, but not limited to, disk 315, solid state device 316, and tape 317.

Interactions between BCD 302 and SCD 304 may be controlled, at least in part, by a protocol 303. Similarly, interactions between BCD 312 and SCD 314 may also be controlled, at least in part, by a protocol 313. Protocols like protocol 303 may define and control items including but not limited to, what types of things a BCD may ask for from an SCD, when a BCD may ask for things from an SCD, what a BCD would like an SCD to store, and when a BCD would like an SCD to store something.

Recall that a conventional inline bandwidth-centric dedupe device like a WANAX may chunk and hash data in one way (e.g., fixed size blocks, narrow hash). A space-centric dedupe device like a DXI apparatus from Quantum may be able to chunk and hash data in more than one way. Additionally, a space-centric dedupe device may be able to look at data from different points of view in parallel. Thus, the interaction between the BCD and the SCD can extend the event horizon for bandwidth-centric dedupe not only by providing additional memory in which additional chunks and fingerprints can be stored to lengthen the event horizon in time but also by providing additional processing power that can look for bandwidth usage reducing efficiencies in parallel, which can broaden the event horizon into a wider vista. By way of analogy, if the bandwidth-centric dedupe device is a single copy reference librarian with six square feet of desk space who is tasked with evaluating whether information has been recently accessed, the task will be limited by the amount of available desk space and the fact that there is a single librarian. Interacting with the space-centric dedupe device not only provides a lot more space (e.g., a warehouse full of boardroom tables), but also adds extra reference librarians who can look at problems from similar and different points of views.

While a conventional WANAX may have had limited visibility into messages associated with certain protocols, example systems and methods may not be so limited. For example, a conventional WANAX may have chunked and hashed fixed size blocks and thus may not have been able to analyze a message (e.g., HTTP message) as a message. Messages may have been viewed merely as streams of bytes that bandwidth-centric dedupe would handle at the byte level. Example systems and methods may provide visibility into protocol messages as messages associated with protocols including, but not limited to, HTTP, CIFS, FTP, NDMP, and even proprietary protocols.

A bandwidth-centric device (BCD) and a space-centric device (SCD) may chunk and fingerprint in different ways. In some configurations, the BCD and the SCD may not employ the same approach or algorithm for chunking and fingerprinting data. To handle this potential incompatibility between devices, the SCD could be configured to use the BCD approach, and/or the SCD could perform processing to reconcile the BCD approach and the SCD approach so that the two approaches and two devices could peacefully co-exist. This may involve a negotiation between the devices and/or approaches. In one embodiment, the negotiation may include selecting a BCD algorithm and/or an SCD algorithm based on a factor like, for example, the load.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
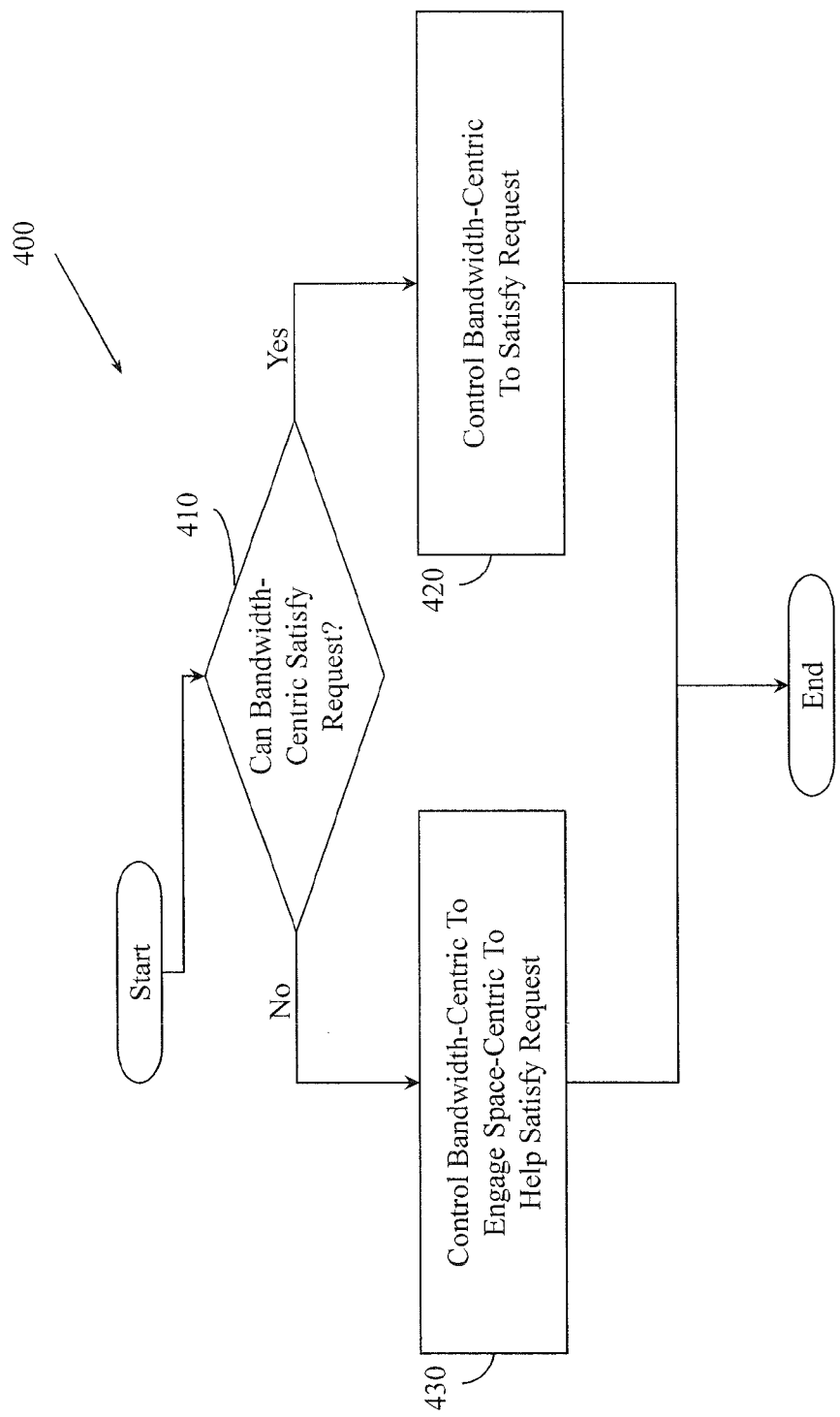
FIG. 4 illustrates a method associated with supporting bandwidth-centric deduplication with space-centric deduplication.

FIG. 4 illustrates a method 400. Method 400 includes, at 410, determining whether a bandwidth-centric deduplication device can satisfy a deduplication request associated with a data communication. If the determination at 410 is yes, then at 420, upon determining that the bandwidth-centric deduplication device can satisfy the request, method 400 includes controlling the bandwidth-centric deduplication device to satisfy the request. If the determination at 410 is no, then at 430, upon determining that the bandwidth-centric deduplication device can not satisfy the request, method 400 includes controlling the bandwidth-centric deduplication device to engage a space-centric deduplication device to co-operate in attempting to satisfy the request.

In one example, the bandwidth-centric deduplication device may be a network accelerator (e.g., WANAX). In one example, the bandwidth-centric deduplication device may be configured to perform inline deduplication where data is deduplicated before being stored and the space-centric deduplication device may be configured to perform post-processing deduplication where data is stored before being deduplicated.

The request can be, for example, a request to provide data, a request to provide a data fingerprint, and other requests. The request may be received from a local side of a network communication or from a remote side of a network communication. If a request from a local side of a network communication can be satisfied from the local side then a network transfer may be avoided and bandwidth usage may be reduced. Satisfying the request may include, but is not limited to, providing data, providing a data fingerprint, and providing instructions to a remote device for locally providing data. To reduce bandwidth consumption, the deduplication devices will attempt to satisfy the request from a local side of the network and thereby avoid a network communication of duplicate data.

The request may be associated with protocols including, but not limited to, a file transfer protocol (FTP), a hypertext transfer protocol (HTTP), a network file system (NFS), a network data management protocol (NDMP), and a common internet file system (CIFS).

Figure 5:
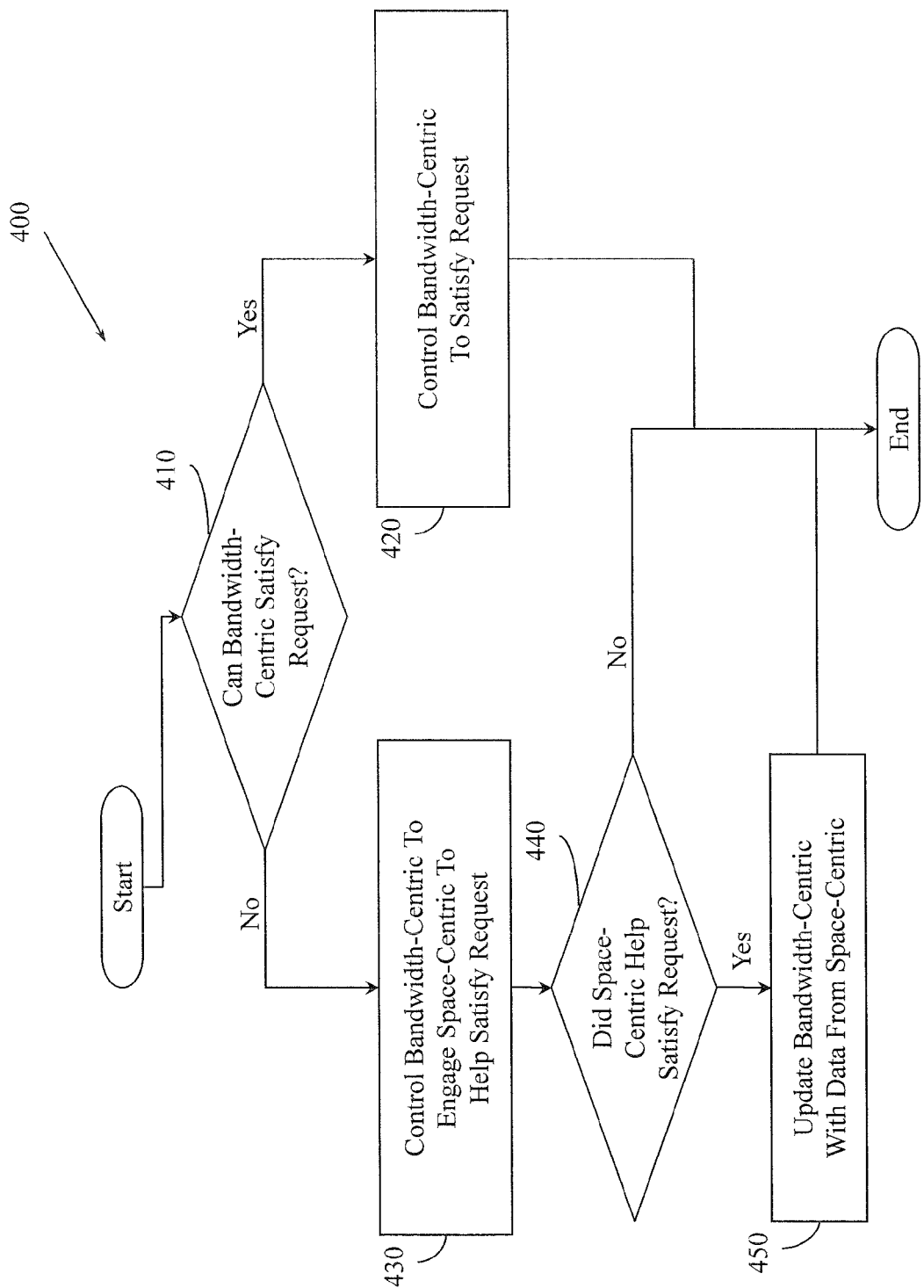
FIG. 5 illustrates a method associated with supporting inline bandwidth-centric deduplication with post-processing space-centric deduplication.

FIG. 5 illustrates another embodiment of method 400. This embodiment includes the additional action at 440 of determining whether the space-centric deduplication device participated in satisfying the request. If the determination at 440 is no, then processing may conclude. However, if the determination at 440 is yes, that the space-centric device participated in satisfying the request, then this embodiment of method 400 may proceed, at 450, with updating the bandwidth-centric deduplication device with data from the space-centric deduplication device. While FIG. 5 illustrates this processing occurring in serial, in one embodiment some processing may proceed in parallel to prevent a data blocking operation. The bandwidth-centric deduplication device may be updated with, for example, data that was used to satisfy the request. For example, if the space-centric device provided a chunk of duplicate data or a fingerprint (e.g., hash) of the chunk of duplicate data, then the chunk or hash may selectively be stored in the bandwidth-centric device in anticipation of that chunk or fingerprint being encountered again within the event horizon of the bandwidth-centric device.

In one example, the space-centric device may also provide data that was not used to satisfy the request, but that is related to data that satisfied the request. In some situations, a prediction of which subblock or fingerprint will be needed next can be made based on the subblock or fingerprint that has just been encountered. This is due to a phenomenon known as locality of access and the fact that blocks are often processed in a predictable order. For example, if the first block of a file is encountered, it may be more likely that the second and third blocks of the file will be encountered next. By providing to the bandwidth-centric device a block or blocks that the space-centric device predicts will be encountered next, the space-centric device may improve performance in the bandwidth-centric device by pre-positioning data that is likely to be encountered. This type of predictive pre-fetching has typically been unavailable to bandwidth-centric deduplication, particularly inline bandwidth-centric deduplication. In one embodiment, the SCD may maintain a single pool of dedupe blocks for both the SCD and the BCD. In another embodiment, the SCD may maintain separate pools for BCDs and SCDs.

Figure 6:
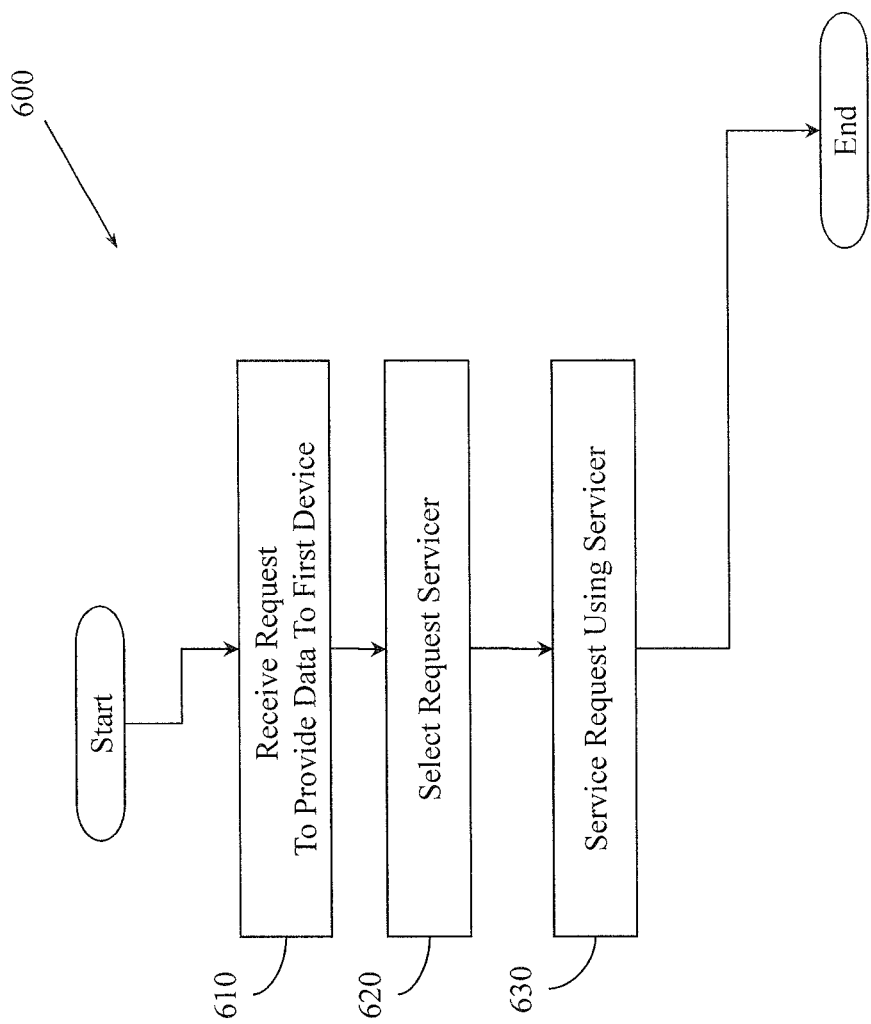
FIG. 6 illustrates a method associated with supporting bandwidth-centric deduplication with space-centric deduplication.

FIG. 6 illustrates a method 600. Method 600 is a method for delivering data in a data communication environment. The data communication environment may include a number of devices that communicate with each other either directly or through a network. The devices may include a first computing device (e.g., computer), a first bandwidth-centric inline deduplication device (e.g., WANAX) associated with the first computing device and configured to transceive data to and from the network, and a first space-centric post-processing deduplication device associated with the first computing device. Method 600 may try to reduce bandwidth usage by providing data to the first computing device from either the first bandwidth-centric device or the first space-centric device rather than having to communicate across the network. The environment may also include a second computing device (e.g., computer), a second bandwidth-centric inline deduplication device (e.g., WANAX) associated with the second computing device and configured to transceive data to and from the network, and a second space-centric post-processing deduplication device associated with the second computing device. If a network communication is required, the first devices may try to reduce bandwidth usage by interacting with the second deduplication devices at a fingerprint level rather than at a data block level. In the environment, the first computing device and the second computing device are configured to communicate with the network via, respectively, the first bandwidth-centric inline deduplication device and the second bandwidth-centric deduplication device.

Method 600 may include, at 610 receiving a request to deliver data to the first computing device. The request may have come from the first device or may have come from another member of the communication environment. If it is possible to provide the data from a device that sits on the same side of the network as the first computing device, then network bandwidth usage may be reduced. Therefore, method 600 includes, at 620, selecting a request servicer from a set of eligible servers. The set of eligible servers may include, but is not limited to including, the first bandwidth-centric inline deduplication device, the first space-centric post-processing deduplication device, the second bandwidth-centric inline deduplication device, the second space-centric post-processing deduplication device, and the second computing device.

Since method 600 is seeking to reduce bandwidth usage, the servicer may be selected as a function of which servicer will minimize bandwidth usage on the network in satisfying the request. When making the selection, the fact that a bandwidth-centric servicer may engage a space-centric servicer to help satisfy the request may be considered. In conventional systems, there was unlikely to be a space-centric device available to participate in servicing the request and, even if a space-centric device was available, the bandwidth-centric device was not configured to engage the space-centric device as a second tier or as a helper.

Once the provider has been selected, method 600 concludes at 630 by controlling the provider to satisfy the request. In one embodiment, the servicer is selected at 620 based both on reducing bandwidth usage and as a function of which servicer will minimize the time required to satisfy the request.

In one example, the first bandwidth-centric inline deduplication device is a wide area network (WAN) accelerator. In one example, the first space-centric post-processing deduplication device is a Quantum DXI apparatus. While a WAN accelerator and a Quantum DXI apparatus are described, it is to be appreciated that different bandwidth-centric devices and different space-centric devices may be employed. Additionally, while inline bandwidth-centric dedupe and post-processing space-centric dedupe is described, it is to be appreciated that other dedupe approaches may be employed in the multi-tier collaborative approach of method 600 where a second dedupe apparatus interacts with and supports a first dedupe apparatus.

Figure 7:
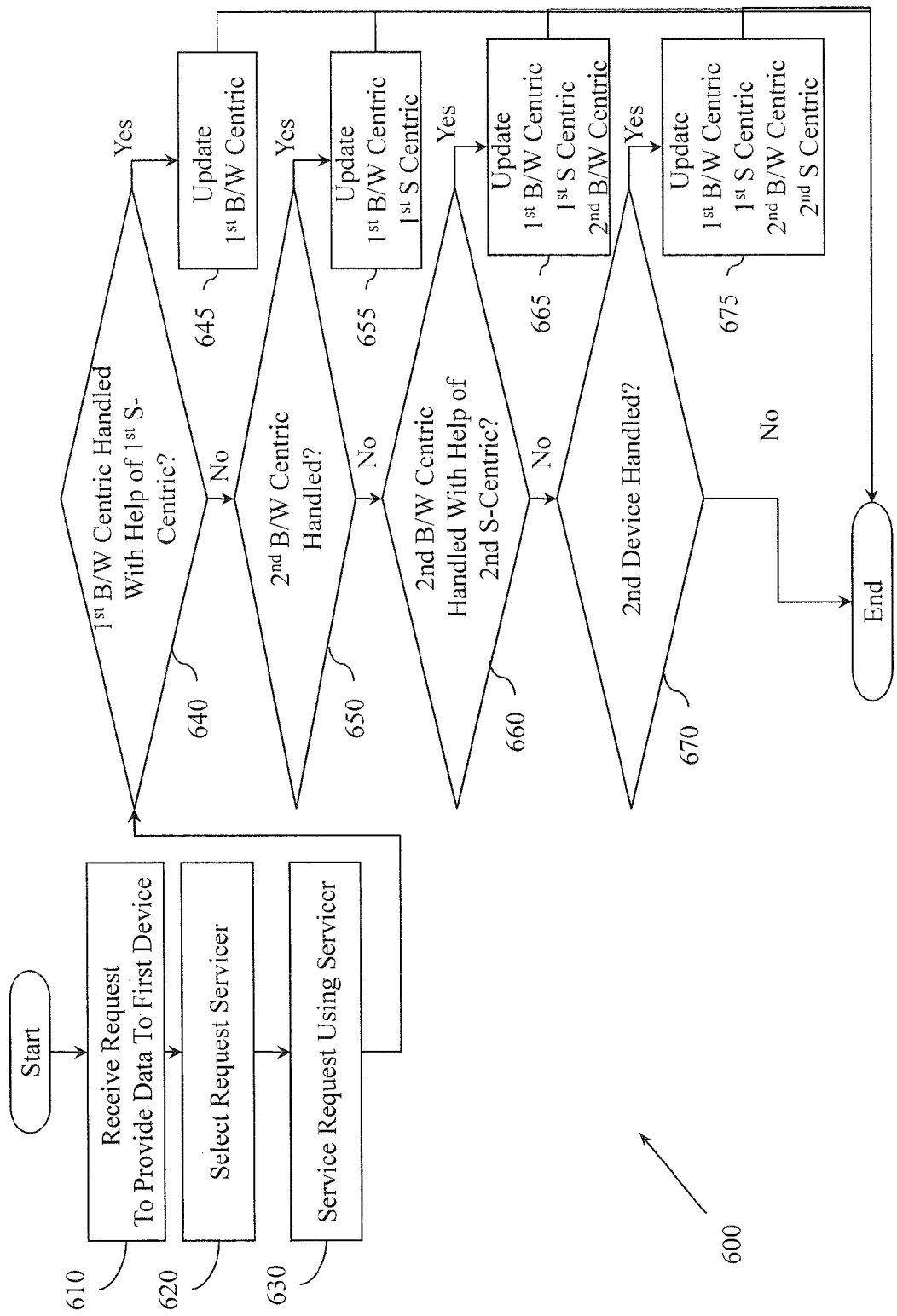
FIG. 7 illustrates a method associated with supporting inline bandwidth-centric deduplication with post-processing space-centric deduplication.

FIG. 7 illustrates another embodiment of method 600. This embodiment includes actions for updating devices with data that is used to satisfy the request. For example, if a space-centric device supports a bandwidth-centric device by providing a duplicate chunk of data or a fingerprint of a duplicate chunk of data, then the bandwidth-centric device may be updated with that chunk or fingerprint. Additionally, a space-centric device may make a predictive pre-fetch and a bandwidth-centric device may be updated with the predictive information.

Thus, in one example, this embodiment of method 600 includes, at 640, determining whether the request is satisfied by the first bandwidth-centric inline deduplication device with the help of the first space-centric post-processing deduplication device. If the answer at 640 is yes, then the method proceeds, at 645, to selectively update the first bandwidth-centric inline deduplication device with at least one piece of information from the first space-centric post-processing device. If the answer at 640 is no, then processing continues at 650.

At 650, this embodiment of method 655 includes determining whether the request is satisfied by the second bandwidth-centric inline deduplication device. If the answer at 650 is yes, then method 600 proceeds, at 655 to selectively update the first bandwidth-centric inline deduplication device with at least one piece of information from the second bandwidth-centric inline deduplication device and to selectively update the first space-centric post-processing deduplication device with at least one piece of information from the second bandwidth-centric inline deduplication device. If the answer at 650 is no, then processing continues at 660.

At 660, this embodiment of method 600 includes determining whether the request is satisfied by the second bandwidth-centric inline deduplication device with the help of the second space-centric post-processing deduplication device. If the answer at 660 is yes, then method 600 proceeds, at 665, to selectively update the second bandwidth-centric inline deduplication device with at least one piece of information from the second space-centric post-processing deduplication device, to selectively update the first bandwidth-centric inline deduplication device with at least one piece of information from the second space-centric post-processing deduplication device, and to selectively update the first space-centric post-processing deduplication device with at least one piece of information from the second space-centric post-processing deduplication device. If the answer at 660 is no, then processing continues at 670.

At 670, this embodiment of method 600 includes determining whether the request is satisfied from the second computing device. If the answer at 670 is yes, then the method continues at 675 by selectively updating the second space-centric post-processing deduplication device with at least one piece of information from the second computing device, selectively updating the second bandwidth-centric inline deduplication device with at least one piece of information from the second computing device, selectively updating the first bandwidth-centric inline deduplication device with at least one piece of information from the second computing device, and selectively updating the first space-centric post-processing deduplication device with at least one piece of information from the second computing device.

While FIG. 7 illustrates various actions occurring in serial, it is to be appreciated that various actions illustrated in FIG. 7 could occur substantially in parallel. By way of illustration, a first process could select a request servicer, a second process could control servicing the request, and a third process could handle updating devices based on which device satisfied the request. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform methods described herein including methods 400, and 600. While executable instructions associated with these methods are described as being stored on a computer-readable medium, it is to be appreciated that executable instructions associated with other example methods described herein may also be stored on a computer-readable medium.

Figure 8:
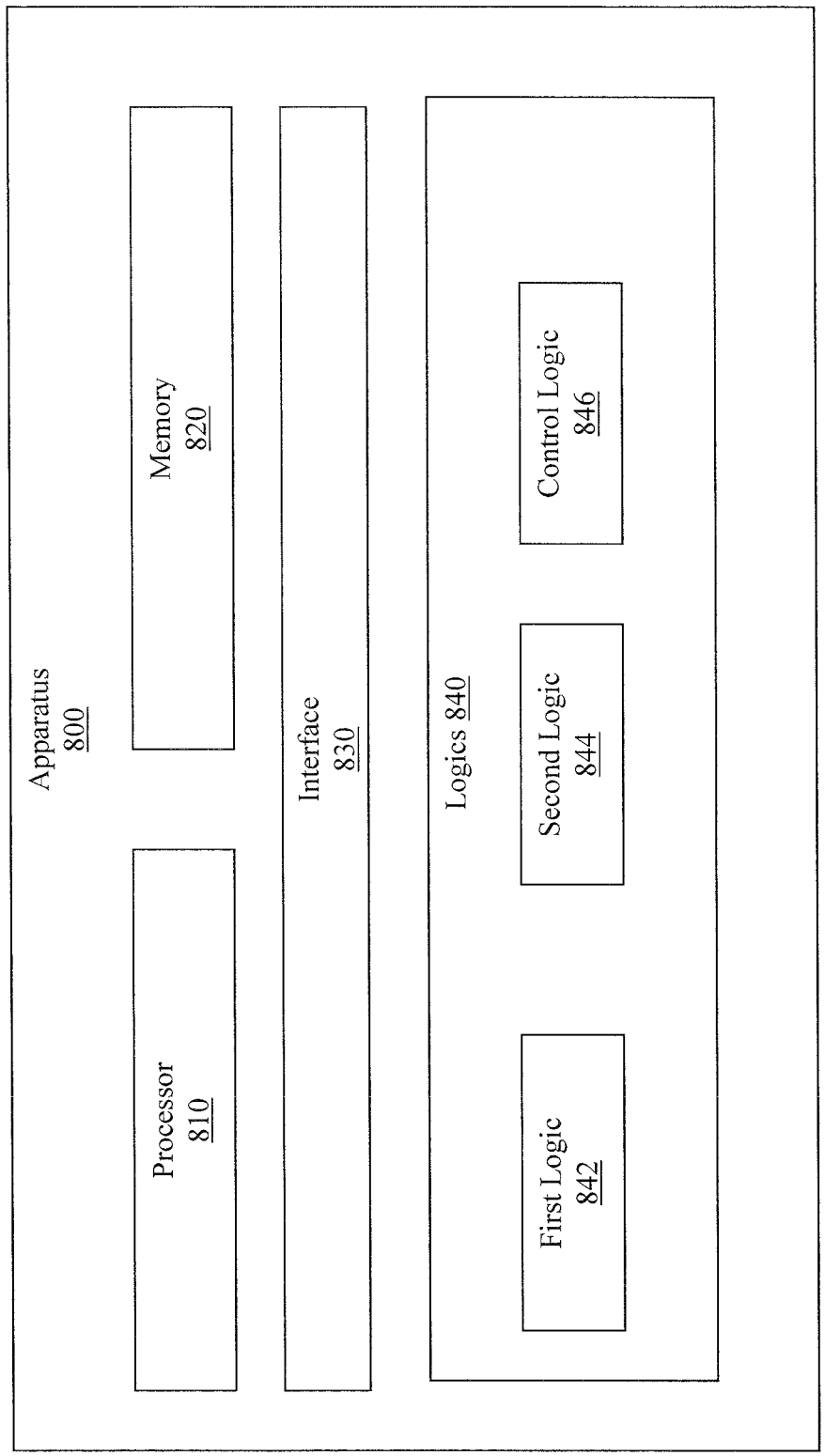
FIG. 8 illustrates an apparatus associated with multi-tier bandwidth-centric deduplication.

FIG. 8 illustrates an apparatus 800. Apparatus 800 includes a processor 810, a memory 820, a set 840 of logics, and an interface 830 configured to connect the processor 810, the memory 820, and the set 840 of logics. In one example apparatus 800 is a computer that may communicate with another computer across a network.

The set of logics may include a first logic 842, a second logic 844, and a control logic 844. The logics can include, but are not limited to including, circuits, circuit boards, and different logical applications of a general purpose circuit that is configured to perform unique functions at controllable periods of time.

In one example, the first logic 842 is configured to perform inline deduplication for data being communicated over a network. The inline deduplication may be associated with reducing bandwidth usage.

In one example, the second logic 844 is configured to perform post processing deduplication for a device that communicates over the network. The post-processing deduplication may be associated with reducing storage requirements.

Control logic 846 is configured to selectively support the operation of the first logic 842 using the second logic 844. The control logic 846 is configured to control the inter-operation of the first logic 842 and the second logic 844 to reduce bandwidth usage on the network by reducing how much duplicate data is transmitted over the network. Thus, supporting the operation of the first logic 842 using the second logic 844 can include, but is not limited to, accessing data deduplicated by the second logic 844, accessing deduplicated data that is available to the second logic 844, and accessing a deduplication process available to the second logic 844.

In one embodiment the control logic 846 may control first logic 842 and second logic 844 to operate in parallel while in another embodiment the control logic 846 may control first logic 842 to make serial requests of second logic 844. The serial requests may be made automatically or may be made selectively when the first first logic 842 determines that it may not be able to generate a desired bandwidth reduction. Different control combinations may be employed. However, unlike conventional systems where bandwidth reduction deduplication and storage reduction deduplication did not work together, and/or unlike conventional systems where inline dedupe and post-processing dedupe did not work together, apparatus 800 operates to reduce bandwidth usage by having control logic 844 bring the two different approaches together.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Inline deduplication" as used herein refers to deduplication that is performed on data before it is stored to a secondary device.

"Post-processing deduplication" as used herein refers to deduplication that is performed on data after it is stored to a secondary device.

"Bandwidth-centric deduplication" as used herein refers to deduplication whose primary focus is on reducing bandwidth requirements by reducing the transmission of duplicate data.

"Space-centric deduplication" as used herein refers to deduplication whose primary focus is on reducing storage requirements by reducing the storage of duplicate data.

While example apparatus, methods, and computer-readable media have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A method for delivering data in a data communication environment, where the data communication environment includes a network, a first computing device, a first bandwidth-centric inline deduplication device associated with the first computing device and configured to transceive data to and from the network, a first space-centric post-processing deduplication device associated with the first computing device, a second computing device, a second bandwidth-centric inline deduplication device associated with the second computing device and configured to transceive data to and from the network, and a second space-centric post-processing deduplication device associated with the second computing device, where the first computing device and the second computing device are configured to communicate via the network in the data communication environment via, respectively, the first bandwidth-centric inline deduplication device and the second bandwidth-centric deduplication device, the method comprising:

in response to receiving a request to deliver data to the first device:

selecting a request servicer from a set of eligible servers comprising the first bandwidth-centric inline deduplication device, the first space-centric post-processing deduplication device, the second bandwidth-centric inline deduplication device, the second space-centric post-processing deduplication device, and the second computing device, where the servicer is selected as a function of which servicer will minimize bandwidth usage on the network in satisfying the request, and where a bandwidth-centric servicer may engage a space-centric servicer to help satisfy the request;

controlling the servicer to satisfy the request, and upon determining that the request is satisfied by the second bandwidth-centric inline deduplication device with the help of the second space-centric post-processing deduplication device, selectively updating the second bandwidth-centric inline deduplication device with at least one piece of information from the second space-centric post-processing deduplication device, selectively updating the first bandwidth-centric inline deduplication device with at least one piece of information from the second space-centric post-processing deduplication device, and selectively updating the first space-centric post-processing deduplication device with at least one piece of information from the second space-centric post-processing deduplication device.

2. The method of claim 1, where the servicer is selected as a function of which servicer will minimize the time required to satisfy the request.

3. The method of claim 1, where the method includes, upon determining that the request is satisfied by the first bandwidth-centric inline deduplication device with the help of the first space-centric post-processing deduplication device, selectively updating the first bandwidth-centric inline deduplication device with at least one piece of information from the first space-centric post-processing device.

4. The method of claim 1, where the method includes, upon determining that the request is satisfied by the second bandwidth-centric inline deduplication device, selectively updating the first bandwidth-centric inline deduplication device with at least one piece of information from the second bandwidth-centric inline deduplication device and selectively updating the first space-centric post-processing deduplication device with at least one piece of information from the second bandwidth-centric inline deduplication device.

5. The method of claim 1, where the first bandwidth-centric inline deduplication device is a wide area network (WAN) accelerator.

6. The method of claim 1, where the first space-centric post-processing deduplication device is a Quantum DXI apparatus.

7. A method for delivering data in a data communication environment, where the data communication environment includes a network, a first computing device, a first bandwidth-centric inline deduplication device associated with the first computing device and configured to transceive data to and from the network, a first space-centric post-processing deduplication device associated with the first computing device, a second computing device, a second bandwidth-centric inline deduplication device associated with the second computing device and configured to transceive data to and from the network, and a second space-centric post-processing deduplication device associated with the second computing device, where the first computing device and the second computing device are configured to communicate via the network in the data communication environment via, respectively, the first bandwidth-centric inline deduplication device and the second bandwidth-centric deduplication device, the method comprising:

in response to receiving a request to deliver data to the first device:

selecting a request servicer from a set of eligible servers comprising the first bandwidth-centric inline deduplication device, the first space-centric post-processing deduplication device, the second bandwidth-centric inline deduplication device, the second space-centric post-processing deduplication device, and the second computing device, where the servicer is selected as a function of which servicer will minimize bandwidth usage on the network in satisfying the request, and where a bandwidth-centric servicer may engage a space-centric servicer to help satisfy the request;

controlling the servicer to satisfy the request, and upon determining that the request is satisfied from the second computing device, updating the second space-centric post-processing deduplication device with at least one piece of information from the second computing device, updating the second bandwidth-centric inline deduplication device with at least one piece of information from the second computing device, updating the first bandwidth-centric inline deduplication device with at least one piece of information from the second computing device, and selectively updating the first space-centric post-processing deduplication device with at least one piece of information from the second computing device.

8. The method of claim 7, where the servicer is selected as a function of which servicer will minimize the time required to satisfy the request.

9. The method of claim 7, where the method includes, upon determining that the request is satisfied by the first bandwidth-centric inline deduplication device with the help of the first space-centric post-processing deduplication device, selectively updating the first bandwidth-centric inline deduplication device with at least one piece of information from the first space-centric post-processing device.

10. The method of claim 7, where the method includes, upon determining that the request is satisfied by the second bandwidth-centric inline deduplication device, selectively updating the first bandwidth-centric inline deduplication device with at least one piece of information from the second bandwidth-centric inline deduplication device and selectively updating the first space-centric post-processing deduplication device with at least one piece of information from the second bandwidth-centric inline deduplication device.

* * * * *

UNITED STATES PATENT AND TRADEMARK OFFICE
CERTIFICATE OF CORRECTION

PATENT NO. : 9,071,584 B2  
APPLICATION NO. : 13/245015  
DATED : June 30, 2015  
INVENTOR(S) : LaRiviere et al.

It is certified that error appears in the above-identified patent and that said Letters Patent is hereby corrected as shown below:

In the References Cited, Other Publications:

Replace "Stephanie N. Jones, Online De-duplicateion in a Log-Structured File System for Primary Storage, May 2011." with --Stephanie N. Jones, Online De-duplication in a Log-Structured File System for Primary Storage, May 2011.--.

In the Specification:

In column 3, line 60, delete "Figure one" and insert --FIG. 1--.

Figure 2:
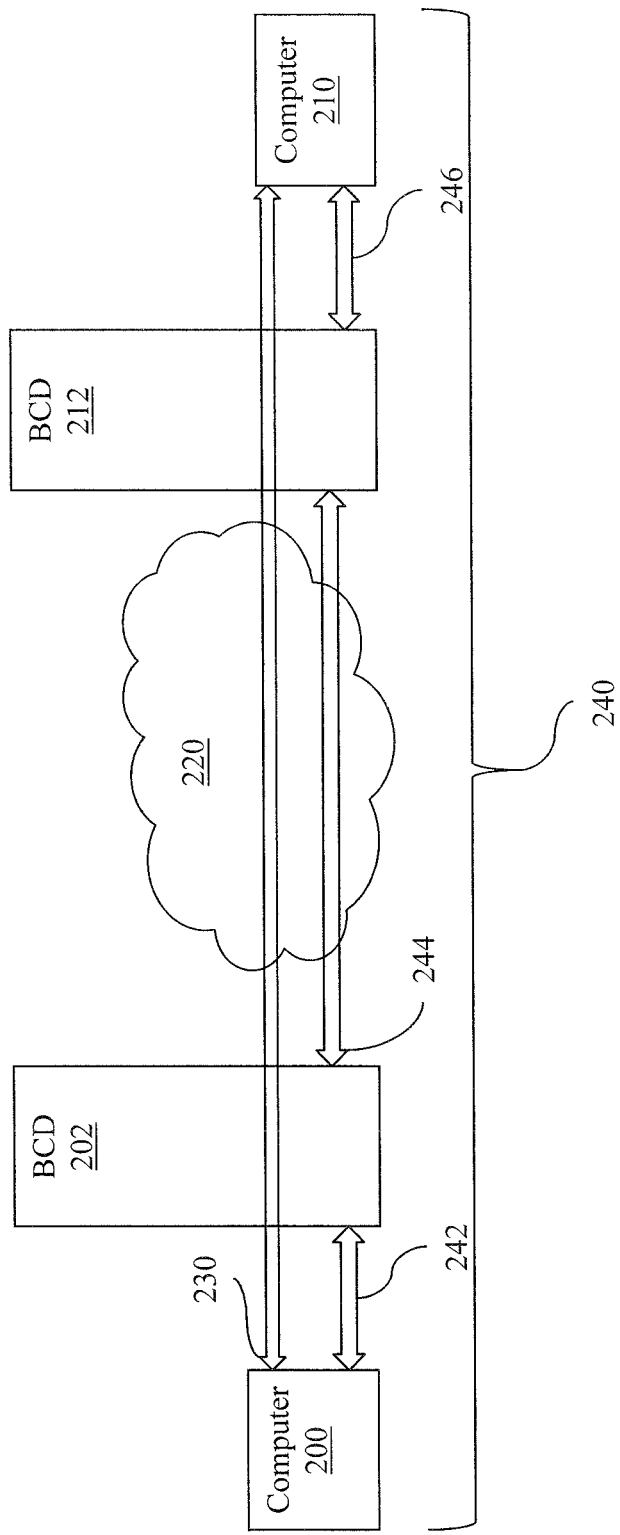
FIG. 2 illustrates a conventional network communication environment that includes inline bandwidth-centric deduplication apparatus.

In column 4, line 48, delete "Figure two" and insert --FIG. 2--.

Figure 3:
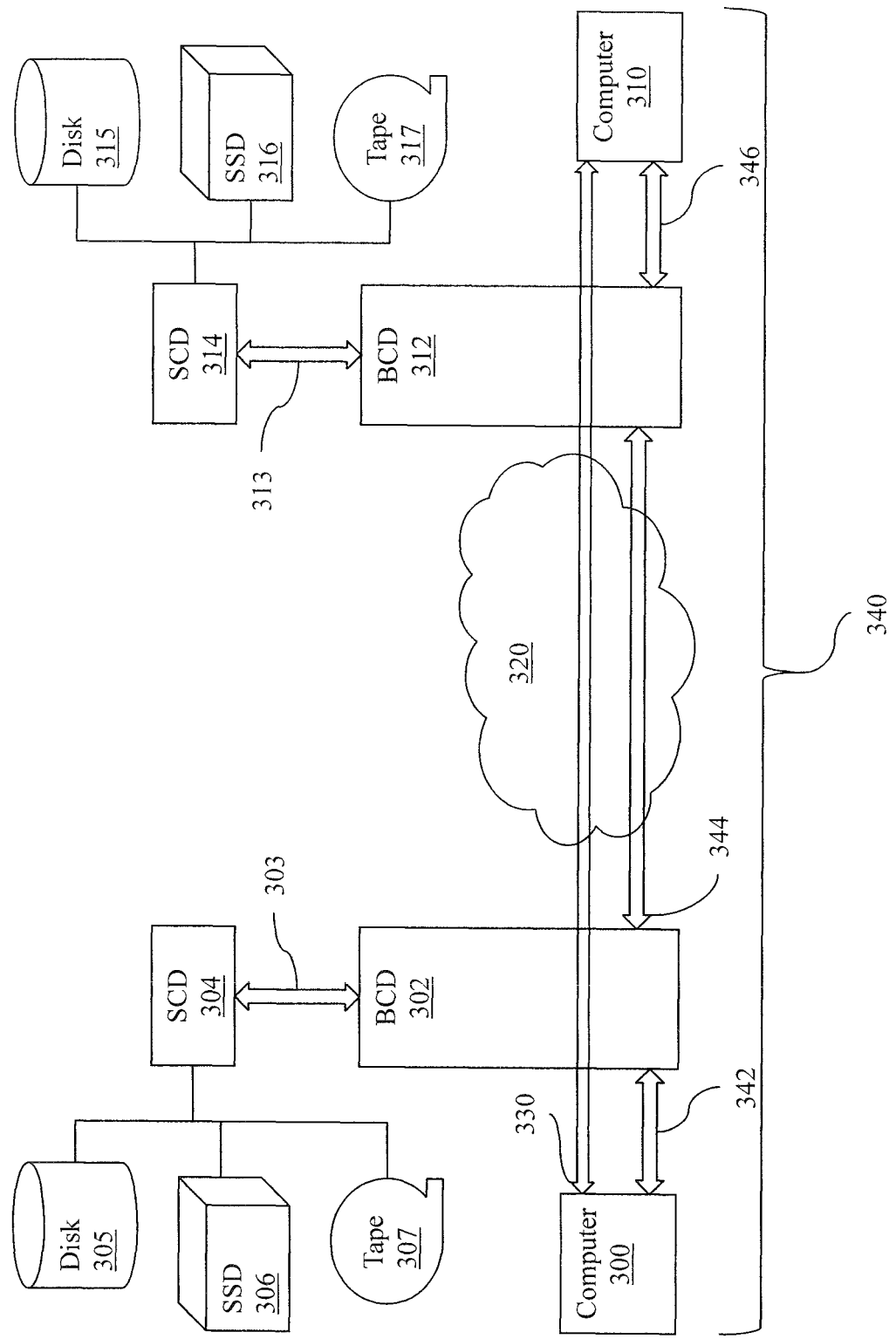
FIG. 3 illustrates a network communication environment that includes both bandwidth-centric deduplication devices and space-centric deduplication devices.

In column 6, line 60, delete "Figure three" and insert --FIG. 3--.

In column 6, line 66, delete "Figure three" and insert --FIG. 3--.

In column 8, line 66, delete "can not" and insert --cannot--.

In column 10, line 32, delete "610 receiving" and insert --610, receiving--.

In column 11, line 32, delete "655 to" and insert --655, to--.

In column 11, line 59, delete "continues at 675 by" and insert --continues, at 675, by--.

In column 12, line 31, delete "set of" and insert --set 840 of--.

In column 12, line 56, delete "embodiment the" and insert --embodiment, the--.

Signed and Sealed this  
Seventeenth Day of November, 2015

Michelle K. Lee  
*Director of the United States Patent and Trademark Office*

CERTIFICATE OF CORRECTION (continued)
U.S. Pat. No. 9,071,584 B2

In the Specification:

In column 12, line 57, delete "parallel while" and insert --parallel, while--.

In column 12, line 58, delete "embodiment the" and insert --embodiment, the--.

In column 12, line 61, delete "the first first logic" and insert --the first logic--.

In column 13, line 53, delete "deduplication" as used herein refers" and insert --deduplication", as used herein, refers--.

In column 13, line 56, delete "deduplication" as used herein refers" and insert --deduplication", as used herein, refers--.

In column 13, line 59, delete "deduplication" as used herein refers" and insert --deduplication", as used herein, refers--.

In column 13, line 62, delete "deduplication" as used herein refers" and insert --deduplication", as used herein, refers--.

In column 14, line 17, delete "B) it" and insert --B), it--.

In column 14, line 19, delete "both" then" and insert --both", then--.

In the Claims:

In column 16, line 3, Claim 7, delete "bandwidth-centric deduplication" and insert --bandwidth-centric inline deduplication--.